(12) United States Patent
Nakano et al.

(10) Patent No.: US 7,407,536 B2
(45) Date of Patent: Aug. 5, 2008

(54) INK COMPOSITION

(75) Inventors: Kaori Nakano, Tokyo (JP); Ken Yamasaki, Tokyo (JP); Seiji Aida, Tokyo (JP); Takahiko Uesugi, Tokyo (JP); Nozomi Tsushima, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 11/604,244

(22) Filed: Nov. 27, 2006

(65) Prior Publication Data

US 2007/0119335 A1     May 31, 2007

(30) Foreign Application Priority Data

Nov. 28, 2005  (JP)  ............... 2005-342662

(51) Int. Cl.
*C09D 11/00* (2006.01)
(52) U.S. Cl. ............... 106/31.13; 106/31.76; 106/31.77; 106/31.78
(58) Field of Classification Search ............... 106/31.13, 106/31.27, 31.28, 31.29, 31.43, 31.59, 31.76, 106/31.78, 31.79
See application file for complete search history.

(56) References Cited

U.S. PATENT DOCUMENTS

| | | | |
|---|---|---|---|
| 5,882,389 A | | 3/1999 | Schwarz, Jr. |
| 2004/0266907 A1 | | 12/2004 | Sugita et al. |
| 2004/0266912 A1 | * | 12/2004 | Aida et al. ............... 523/160 |
| 2005/0098063 A1 | * | 5/2005 | Lee et al. ............... 106/31.43 |
| 2005/0268816 A1 | * | 12/2005 | Lee et al. ............... 106/31.47 |
| 2006/0117994 A1 | * | 6/2006 | Ryu et al. ............... 106/31.58 |
| 2007/0138300 A1 | * | 6/2007 | Janot et al. ............... 235/492 |

FOREIGN PATENT DOCUMENTS

| | | |
|---|---|---|
| EP | 0 959 174 | 11/1999 |
| JP | 60104076 A | * 6/1985 |
| JP | 6-228476 | 8/1994 |

* cited by examiner

*Primary Examiner*—Jerry A. Lorengo
*Assistant Examiner*—Shuangyi Abu Ali
(74) *Attorney, Agent, or Firm*—Wenderoth, Lind & Ponack, L.L.P.

(57) ABSTRACT

An ink composition containing an organic solvent and a pigment, which has a little amount of smell, excellent safety and health properties, excellent resin solubility, excellent printing stability and excellent drying properties, causes no corrosion to a printer, and is excellent in adhesion to non-absorbable printing media and good printability, wherein the ink composition comprises as the organic solvent at least one compound selected from compounds represented by the formulae (1) to (3), wherein each of $R_1$, $R_2$, $R_3$, $R_4$, $R_7$ and $R_8$ independently represents an alkylene group having 1 to 4 carbon atoms or an alkenylene group having 2 to 4 carbon atoms and each of $R_5$, $R_6$ and $R_9$ independently represents a hydrogen atom or an alkyl group having 1 to 5 carbon atoms.

5 Claims, No Drawings

INK COMPOSITION

FIELD OF THE INVENTION

The present invention relates to an ink composition comprising an organic solvent and a pigment, which has a little amount of smell, excellent safety and health properties, excellent resin solubility, excellent printing stability and excellent drying properties, causes no corrosion in a printer, and is excellent in adhesion to non-absorbable printing media and good printability.

BACKGROUND OF THE INVENTION

Gravure printing for flexible packaging materials, flexographic printing for sanitary materials, silk screen printing for metal plates, inkjet printing for indoor and outdoor advertisement, and the like, have been generally known as printing methods suitable for non-absorbable printing media. However, ink compositions used for these printing methods generally comprise solvents such as toluene, ethyl acetate, methyl ethyl ketone, methyl isobutyl ketone and cyclohexanone. However, obligations such as an ambient concentration under a specified value, the installation of a local exhauster because of smells or the like, and regular medical examinations, are imposed. Thus, handling is difficult. Therefore, inks having higher safety and health properties are required. In particular, unlike gravure printing, flexographic printing and silk screen printing which are performed in exclusive factories, inkjet printing is used in ordinary business offices so that it is required to give more consideration to safety, hazardousness and odour.

Under the above circumstances, with regard to gravure printing for flexible packaging materials and flexographic printing for sanitary materials, non-toluene inks which do not comprise toluene whose ambient concentration set value is small or water-based inks which comprise alcohols as a main component, have been developed.

In regard to inkjet printing, an ink which uses a polyalkylene glycol solvent or a hydrocarbon solvent (Japanese Patent No. 3590486) has been developed. However, such inks cannot dissolve the surface of the printing media, and thus result in poor fixity and water resistance.

In recent years, accordingly, solvent-containing inks with improved fixity and water resistance have been developed, by jointly using a nitrogen-containing heterocyclic compound such as 2-pyrrolidone or N-methyl-2-pyrrolidone or a lactone compound (JP-A-2005-60716, JP-A-2005-15672, JP-A-2005-200469, Japanese Patent No. 3692365) as an assistant solvent. However, due to their strong solubility, in some cases, these materials and the odour need consideration.

SUMMARY OF THE INVENTION

An object of the present invention is to provide an ink composition which has a little amount of smell, excellent safety and health properties, excellent resin solubility, excellent printing stability and excellent drying properties, causes no corrosion to a printer, and is excellent in adhesion to non-absorbable printing media and good printability.

According to the present invention, there is provided an ink composition containing an organic solvent and a pigment, which comprises as the organic solvent at least one compound selected from a compound represented by the formula (1), a compound represented by the formula (2) and a compound represented by the formula (3),

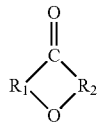

(1)

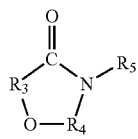

(2)

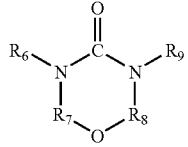

(3)

wherein each of $R_1$, $R_2$, $R_3$, $R_4$, $R_7$ and $R_8$ independently represents an alkylene group having 1 to 4 carbon atoms or an alkenylene group having 2 to 4 carbon atoms and each of $R_5$, $R_6$ and $R_9$ independently represents a hydrogen atom or an alkyl group having 1 to 5 carbon atoms.

According to the present invention, further, there is provided the ink composition, which further comprises as the organic solvent at least one solvent selected from the group consisting of a solvent represented by the formula (4), a solvent represented by the formula (5), a solvent represented by the formula (6) and a solvent represented by the formula (7), a diacetone alcohol solvent, a paraffin solvent, a naphthene solvent and a paraffin/naphthene solvent, $$R_{10}CO(OR_{11})_ZOR_{12} \quad (4)$$

$$R_{13}CO(OR_{14})_ZOCOR_{15} \quad (5)$$

$$R_{16}(OR_{17})_ZOR_{18} \quad (6)$$

$$R_{19}COOR_{20} \quad (7)$$

wherein $R_{11}$, $R_{14}$ and $R_{17}$ each independently represent an ethylene group or a propylene group, each of $R_{10}$, $R_{12}$, $R_{13}$ and $R_{15}$ independently represents an alkyl group having 1 to 4 carbon atoms, each of $R_{16}$ and $R_{18}$ independently represents a hydrogen atom or an alkyl group having 1 to 4 carbon atoms, $R_{19}$ represents a 2-hydroxyethyl group, $R_{20}$ represents an alkyl group having 1 to 8 carbon atoms, and Z represents an integer of 1 to 3.

According to the present invention, further, there is provided the ink composition, which further comprises a dispersant.

According to the present invention, further, there is provided the ink composition, which further comprises a resin.

According to the present invention, further, there is provided the ink composition, which is used as an ink for non-absorbable printing media printing.

According to the present invention, further, there is provided the ink composition, wherein the ink for non-absorbable printing media printing is used as an inkjet ink.

Effect of the Invention

According to the present invention in which at least one compound selected from compounds represented by the formulae (1) to (3) is added to an ink, there is provided an ink composition which has a little amount of smell and excellent safety and health properties, dissolves slightly the surface of non-absorbable printing media, on which printing is to be done, and thus remarkably increases the adhesion of the ink without corroding the printer. Also, due to the increase of resin solubility in the ink composition, the shelf life such as viscosity stability, the stabilization in continuous printing and the ink stabilization at low temperature are excellent. Thus, the ink composition offered in this present invention has remarkably improved printability.

DETAILED DESCRIPTION OF THE INVENTION

The compounds represented by the formulae (1) to (3), used in the present invention, are preferably compounds wherein each of $R_1$, $R_2$, $R_3$, $R_4$, $R_7$ and $R_8$ independently represents an alkylene group having 1 to 4 carbon atoms or an alkenylene group having 2 to 4 carbon atoms, and each of $R_5$, $R_6$ and $R_9$ independently represents a hydrogen atom or an alkyl group having 1 to 4 carbon atoms, more preferably compounds wherein each of $R_1$, $R_2$, $R_3$, $R_4$, $R_7$ and $R_8$ independently represents an alkylene group having 1 to 3 carbon atoms, and each of $R_5$, $R_6$ and $R_9$ independently represents an alkyl group having 1 to 3 carbon atoms.

Of the compounds represented by the formulae (1) to (3), used in the present invention, the compound represented by the formula (1) or the compound represented by the formula (2) is preferred. In particular, the compound of the formula (1) is preferred.

The ink for printing on non-absorbable printing media, provided by the present invention, contains a compound selected from compounds represented by the formulae (1) to (3) as the organic compound. The content thereof in the ink is preferably 1 to 50% by weight, more preferably 1 to 20% by weight. When the above content is too small, intended adhesion, ink stability and printability cannot be obtained. When it is too large, the ink dissolves the surface of non-absorbable printing media too much, which causes roughness on the surface of printing or a decrease in gloss.

The boiling point, at 1 atmospheric pressure, of each of the compounds represented by the formulae (1) to (3) used in the present invention is preferably at least 140° C., more preferably 150° C. to 220° C., particularly preferably 160° C. to 200° C. When the boiling point at 1 atmospheric pressure is lower than 140° C., drying after printing advances too promptly and this solvent volatilizes before dissolving the surface of non-absorbable printing media, so that sufficient adhesion cannot be obtained. When the boiling point is high, basically no problem occurs. However, it is preferred that the boiling point is 220° C. or lower in consideration of the performance of a drying device, etc., of a printer to be used.

Specific examples of the compound of the formula (1) are shown in the following Table 1.

TABLE 1

| Compound | Structural formula |
|---|---|
| 1 | (structure) |
| 2 | (structure) |
| 3 | (structure) |
| 4 | (structure) |
| 5 | (structure) |
| 6 | (structure) |
| 7 | (structure) |
| 8 | (structure) |
| 9 | (structure) |
| 10 | (structure) |

TABLE 1-continued

| Compound | Structural formula |
|---|---|
| 11 | |
| 12 | |
| 13 | |
| 14 | |

Specific examples of the compound of the formula (2) are shown in the following Table 2.

TABLE 2

| Compound | Structural formula |
|---|---|
| 15 | |
| 16 | |
| 17 | |
| 18 | |

TABLE 2-continued

| Compound | Structural formula |
|---|---|
| 19 | |
| 20 | |
| 21 | |
| 22 | |
| 23 | |
| 24 | |
| 25 | |
| 26 | |
| 27 | |

TABLE 2-continued

| Compound | Structural formula |
|---|---|
| 28 | [structure: morpholin-3-one with N-butyl] |

Specific examples of the compound of the formula (3) are shown in the following Table 3.

TABLE 3

| Compound | Structural formula |
|---|---|
| 29 | [structure: 1,3,5-oxadiazinan-2-one, HN, NH, O] |
| 30 | [structure: with N-methyl] |
| 31 | [structure: N,N'-dimethyl] |
| 32 | [structure: N-methyl, N'-ethyl] |
| 33 | [structure: N-ethyl] |
| 34 | [structure: with methyl on ring carbon] |
| 35 | [structure: N-methyl with methyl on ring carbon] |
| 36 | [structure: dimethyl on ring carbons] |
| 37 | [structure: with ethyl on ring carbon] |
| 38 | [structure: N-ethyl with methyl on ring carbon] |
| 39 | [structure: with two ethyl groups on ring carbons] |

An organic solvent which is used in combination with the above compounds of the formulae (1) to (3) is not specially limited. For the ink for printing on non-absorbable printing media, it is preferred to use an organic solvent having a boiling point of at least 140° C. at 1 atmospheric pressure and it is more preferred to use an organic solvent having a boiling point of at least 140° C. at 1 atmospheric pressure and a flash point of at least 60° C. The mixing ratio of the at least one compound selected from compounds represented by the formula (1) to the formula (3): the organic solvent to be used in combination therewith is preferably 1:0.1 to 84, more preferably 1:1 to 29, particularly preferably 1:3 to 21.

The above organic solvent to be used in combination with the compounds of the formulae (1) to (3) includes solvents represented by the formulae (4) to (7), diacetone alcohol, a paraffin solvent and a naphthene solvent.

$$R_{10}CO(OR_{11})_ZOR_{12} \quad (4)$$

$$R_{13}CO(OR_{14})_ZOCOR_{15} \quad (5)$$

$$R_{16}(OR_{17})_ZOR_{18} \quad (6)$$

$$R_{19}COOR_{20} \quad (7)$$

wherein each of $R_{11}$, $R_{14}$ and $R_{17}$ independently represents an ethylene group or a propylene group, each of $R_{10}$, $R_{12}$, $R_{13}$ and $R_{15}$ independently represents an alkyl group having 1 to 4 carbon atoms, each of $R_{16}$ and $R_{18}$ independently represents a hydrogen atom or an alkyl group having 1 to 4 carbon atoms, $R_{19}$ represents a 2-hydroxyethyl group, $R_{20}$ represents an alkyl group having 1 to 8 carbon atoms, and Z represents an integer of 1 to 3.

The solvent of the formula (4) includes glycol mono acetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butylate, ethylene glycol monoethyl ether butylate, ethylene glycol monobutyl ether butylate, diethylene glycol monomethyl ether butylate, diethylene glycol monoethyl ether butylate, diethylene glycol monobutyl ether butylate, propylene glycol monomethyl ether butylate and dipropylene glycol monomethyl ether butylate.

The solvent of the formula (5) includes glycol diacetates such as ethylene glycol diacetate, diethylene glycol diacetate, propylene glycol diacetate, dipropylene glycol diacetate, ethylene glycol acetate propionate, ethylene glycol acetate butylate, ethylene glycol propionate butylate, ethylene glycol dipropionate, ethylene glycol dibutylate, diethylene glycol acetate propionate, diethylene glycol acetate butylate, diethylene glycol propionate butylate, diethylene glycol dipropionate, diethylene glycol dibutylate, propylene glycol acetate propionate, propylene glycol acetate butylate, propylene glycol propionate butylate, propylene glycol dipropionate, propylene glycol dibutylate, dipropylene glycol acetate propionate, dipropylene glycol acetate butylate, dipropylene glycol propionate butylate, dipropylene glycol dipropionate and dipropylene glycol acetate dibutylate.

The solvent of the formula (6) includes glycols such as ethylene glycol, diethylene glycol, triethylene glycol, propylene glycol and dipropylene glycol and glycol ethers such as ethylene glycol monobutyl ether, propylene glycol monomethyl ether, propylene glycol monobutyl ether, diethylene glycol monoethyl ether, diethylene glycol diethyl ether, diethylene glycol monobutyl ether, diethylene glycol dibutyl ether, diethylene glycol methylethyl ether, dipropylene glycol monomethyl ether, dipropylene glycol monoethyl ether, dipropylene glycol monobutyl ether, propylene glycol n-propyl ether, triethylene glycolmonomethyl ether, triethylene glycol monoethyl ether, triethylene glycol monobutyl ether and tripropylene glycol monomethyl ether. In particular, diethylene glycol diethyl ether, diethylene glycol methylethyl ether and dipropylene glycol monoethyl ether are excellent in view of a little amount of smell and resin solubility.

The solvent of the formula (7) includes esters such as ethyl lactate, propyl lactate and butyl lactate.

Specific examples of the paraffin solvent include Isopar G, H, L and M, Norpar 12, 13 and 15, supplied by Exxon, IP solvent 1620 and 2028 supplied by Idemitsu Kosan Co., Ltd.; Normal Paraffin SL, L, M and H, O type Solvent L, M and H, Isosol 300 and 400, Dry Solvent, Dry Solvent High Soft, Cleansol, Mineral Spirit A, A solvent, and Highalom 2S, supplied by Nippon Oil Corporation; MARUKASOL R supplied by Maruzen Petrochemical Co., Ltd.; Idemitsu Supasol LA25, LA30, LA35, LA41, FP20, FP25, FP30, FP38 and CA25, Diana Fresia P02, P05 and S02, supplied by Idemitsu Kosan Co., Ltd.; Shellsol 71 and 72 supplied by Shell Chemicals Japan Ltd.; and Moresco White P-40, P-55, P-60, P-70, P-80, P-100, P-120, P-150, P-200, P-230, P-260, P-300 and P-350P, and Moresco Violes, supplied by Matsumura Oil Research Corp.

Specific examples of the naphthene solvent include AF-4, AF-7, AF-5, AF-6, and Teclean N16, N20 and N22, supplied by Nippon Oil Corporation.

Specific examples of the paraffin/naphthene mixed solvent include Exxsol D40, D80, D110 and D130, supplied by Exxon, and Shellsol D100, supplied by Shell Chemicals Japan Ltd.

The pigment used in the present invention can be selected from various pigments which are used for printing inks and coatings. Examples of the pigment include, shown as Color Index, Pigment Black 7, Pigment Blue 15, 15:1, 15:3, 15:4, 15:6 and 60, Pigment Green 7 and 36, Pigment Red 9, 48, 49, 52, 53, 57, 97, 122, 149, 168, 177, 178, 179, 206, 207, 209, 242, 254 and 255, Pigment Violet 19, 23, 29, 30, 37, 40 and 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180 and 185, and Pigment Orange 36, 43, 51, 55, 59, 61, 71 and 74. With regard to carbon blacks, all carbon blacks such as neutral carbon blacks, acidic carbon blacks and basic carbon blacks can be used. The content of the pigment in the ink is preferably 0.1 to 10% by weight.

In the present invention, it is preferred to incorporate a dispersant for the purpose of improving the dispersibility of the pigment and the storage stability of the ink. For example, a hydroxyl group-containing carboxylic acid ester, a salt of a long-chainpolyaminoamide and a high molecular weight acid ester, a salt of a high molecular weight polycarboxylic acid, a salt of a long chain polyaminoamide and a polar acid ester, a high molecular weight unsaturated acid ester, a high molecular weight copolymer, a modified polyurethane, a modified polyacrylate, a polyether ester type anionic surfactant, a naphthalenesulfonic acid formalin condensate salt, an aromatic sulfonic acid formalin condensate salt, a polyoxyethylene alkyl phosphoric acid ester, a polyoxyethylene nonylphenyl ether, and stearyl amine acetate can be used.

Specific examples of the dispersant include "Anti-Terra-U (a polyaminoamide phosphoric acid salt)", "Anti-Terra-203/204 (a high molecular weight polycarboxylic acid salt)", "Disperbyk-101 (a polyaminoamide phosphoric acid salt and an acid ester), 107 (a hydroxyl group-containing carboxylic acid ester), 110, 111 (a copolymer containing an acid group), 130 (polyamide), 161, 162, 163, 164, 165, 166, 170 (a high molecular weight copolymer)", "400", "Bykumen (a high molecular weight unsaturated acid ester)", "BYK-P104, P105 (a high molecular weight unsaturated acid polycarboxylic acid)", "P104S, 240S (a high molecular weight unsaturated acid polycarboxylic acid and a silicon type)" and "Lactimon (a long chain amine, an unsaturated acid polycarboxylic acid and a silicon)", supplied by BYK Chemie.

Further, examples of the dispersant include "Efka 44, 46, 47, 48, 49, 54, 63, 64, 65, 66, 71, 701, 764, 766" and "Efka Polymer 100 (modified polyacrylate), 150 (aliphatic modified polymer), 400, 401, 402, 403, 450, 451, 452, 453 (modified polyacrylate), 745 (copper phthalocyanine type)", supplied by Efka CHEMICALS; "Flowlen TG-710 (urethane oligomer)", "Flownon SH-290, SP-1000" and "Polyflow No. 50E, No. 300 (acrylic copolymer)", supplied by Kyoeisha Chemicals Co., Ltd.; and "Disparlon KS-860, 873SN, 874 (high-molecular weight dispersant), #2150 (aliphatic polyhydric carboxylic acid) and #7004 (polyether ester type)", supplied by Kusumoto Chemicals, Ltd.

Furthermore, examples of the dispersant include "Demol RN, N (naphthalenesulfonic acid formalin condensate sodium salt), MS, C, SN-B (aromatic sulfonic acid formalin condensate sodium salt), EP", "Homogenol L-18 (polycarboxylic acid type polymer)", "Emulgen 920, 930, 931, 935, 950, 985 (polyoxyethylene nonyl phenyl ether)", "Acetamin 24 (coconut amine acetate), 86 (stearylamine acetate)", supplied by Kao Corp.; "Solsperse 5000 (phthalocyanine ammonium salt type), 13940 (polyester amine type), 17000 (fatty acid amine type), 24000", supplied by Lubrizol Co.; "Nikkol T106 (polyoxyethylene sorbitan monooleate), MYS-IEX (polyoxyethylene monostearate), Hexagline 4-0 (hexaglyceryl tetraoleate)", supplied by Nikko Chemicals Co., Ltd.; and "AJISPER PB821, PB822 (basic dispersant)", supplied by Ajinomoto Fine-Techno Co., Inc. The content of the dispersant in the ink is preferably 0.1 to 10% by weight.

In the present invention, a resin is preferably added in order to further improve the adhesion to non-absorbable printing media. Examples of the resin which can be used include an acrylic resin, a styrene-acrylic resin, a styrene-maleic acid resin, a rosin resin, a rosin ester resin, an ethylene-vinyl acetate resin, a petroleum resin, a coumarone indene resin, a terpene phenol resin, a phenol resin, an urethane resin, a melamine resin, a urea resin, an epoxy resin, a cellulose resin, a vinyl chloride-vinyl acetate resin, a xylene resin, an alkyd resin, an aliphatic hydrocarbon resin, abutyral resin, amaleic acid resin and a fumaric acid resin. Specific examples of the resin include Super Ester 75, Ester gum HP and MALKYD 33, supplied by Arakawa Chemical Industries, Ltd., YS Polyster T80, supplied by Yasuhara Chemical Co., Ltd., Hiretts HRT200X supplied by Mitsui Chemicals, Johncryl 586 supplied by Johnson Polymer Co., Ltd., UCAR solution vinyl resin VYHD, VYHH, VMCA, VROH and VYLF-X, supplied by Dow Chemicals, and Solbin resin CL, CNL, C5R, TA5R, supplied by Nisshin chemical Industry Co., Ltd. The content of the resin in the ink is preferably 0.1 to 10% by weight.

The ink composition of the present invention may contain a variety of additives such as a plasticizer, a surface conditioner, an ultraviolet light inhibitor, aphotostabilizer, an antioxidant and a hydrolysis inhibitor.

The non-absorbable printing media in the present invention includes polyvinyl chloride sheet, polyolefin sheet, glass and metal. In particular, the polyvinyl chloride resin sheet is preferable.

The printing method of the ink composition of the present invention is typically gravure printing, flexographic printing, silk screen printing or inkjet printing. In particular, the inkjet printing is preferable.

The ink composition of the present invention can be produced as follows. First, the pigment is dispersed together with the resin or the dispersant in a single solvent or mixed solvents by means of a paint shaker, a sand mill, a roll mill or a media-less disperser to obtain a pigment dispersion, and the pigment dispersion is diluted with the solvent of the present invention.

EXAMPLES

The present invention will be concretely explained with reference to Examples hereinafter, while the present invention shall not be limited to these Examples. In Examples, "part" stands for "part by weight".

First, a pigment dispersion A was prepared in accordance with the following recipe. The dispersion A was prepared by adding a pigment and a dispersant to an organic solvent, stirring the mixture with a high speed mixer, etc., until the mixture became homogeneous, and dispersing the thus-obtained mill base with a horizontal sand mill for about 1 hour.

| | |
|---|---|
| LIONOL BLUE FG-7400G (supplied by Toyo Ink Mfg., Co., Ltd, phthalocyanine pigment) | 35.0 parts |
| AJISPER PB821 (supplied by Ajinomoto Fine-Techno Co., Inc, pigment dispersant) | 12.5 parts |
| Diethylene glycol diethyl ether | 52.5 parts |

Further, a pigment dispersion B was prepared in accordance with the following recipe. The pigment dispersion B was prepared by adding a pigment and a dispersant into an organic solvent, stirring the mixture with a high speed mixer, etc., until the mixture became homogeneous, and dispersing the thus-obtained mill base with a horizontal sand mill for about 1.5 hours.

| | |
|---|---|
| YELLOW PIGMENT E4GN (supplied by Lanxess, nickel complex azo pigment) | 30.0 parts |
| Solsperse 17000 (supplied by Lubrizol Co., pigment dispersant) | 16.5 parts |
| Diethylene glycol methyl ethyl ether | 53.5 parts |

Still further, a pigment dispersion C was prepared in accordance with the following recipe. The pigment dispersion C was prepared by adding a pigment and a dispersant into an organic solvent, stirring the mixture with a high speed mixer, etc., until the mixture became homogeneous, and dispersing the thus-obtained mill base with a horizontal sand mill for about 2 hours.

| | |
|---|---|
| Cromophtal Pink PT (supplied by Ciba specialty chemicals, quinacridone pigment) | 32.0 parts |
| Solsperse 24000 (supplied by Lubrizol Co., pigment dispersant) | 12.8 parts |
| Dipropylene glycol monoethyl ether | 55.2 parts |

Furthermore, a pigment dispersion D was prepared in accordance with the following recipe. The pigment dispersion D was prepared by adding a pigment and a dispersant into an organic solvent, stirring the mixture with a high speed mixer, etc., until the mixture became homogeneous, and dispersing the thus-obtained mill base with a horizontal sand mill for about 2 hours.

| | |
|---|---|
| Cromophtal Pink PT (supplied by Ciba specialty chemicals, quinacridone pigment) | 32.0 parts |
| Solsperse 24000 (supplied by Lubrizol Co., pigment dispersant) | 12.8 parts |
| Compound 3 shown in Table 1 | 55.2 parts |

Moreover, a pigment dispersion E was prepared in accordance with the following recipe. The pigment dispersion E was prepared by adding a pigment and a dispersant to an organic solvent, stirring the mixture with a high speed mixer, etc., until the mixture became homogeneous, and dispersing the thus-obtained mill base with a horizontal sand mill for about 1 hour.

| | |
|---|---|
| LIONOL BLUE FG-7400G (supplied by Toyo Ink Mfg., Co., Ltd, phthalocyanine pigment) | 35.0 parts |
| AJISPER PB821 (supplied by Ajinomoto Fine-Techno Co., Inc, pigment dispersant) | 12.5 parts |
| Ethylene glycol monobutyl ether acetate | 52.5 parts |

Example 1

An ink composition was obtained using the pigment dispersion A in accordance with the following recipe.

| | |
|---|---|
| Pigment dispersion A | 11.4 parts |
| Vinyl resin VYHD (supplied by Dow Chemicals, vinyl chloride-vinyl acetate resin) | 4.5 parts |
| BYK-361N (supplied by BYK Chemie, acrylic resin) | 0.5 part |
| Diethylene glycol methyl ethyl ether | 78.6 parts |
| Compound 3 shown in Table 1 | 5.0 parts |

Example 2

An ink composition was obtained using the pigment dispersion A in accordance with the following recipe.

| | |
|---|---|
| Pigment dispersion A | 11.4 parts |
| Vinyl resin VYHD (supplied by Dow Chemicals, vinyl chloride-vinyl acetate resin) | 4.5 parts |
| BYK-361N (supplied by BYK Chemie, acrylic resin) | 0.5 part |
| Diethylene glycol methyl ethyl ether | 53.6 parts |
| Exxsol D80 (supplied by Exxon) | 10.0 parts |
| Compound 4 shown in Table 1 | 20.0 parts |

Example 3

An ink composition was obtained using the pigment dispersion A in accordance with the following recipe.

| | |
|---|---|
| Pigment dispersion A | 11.4 parts |
| Vinyl resin VYHD (supplied by Dow Chemicals, vinyl chloride-vinyl acetate resin) | 4.5 parts |
| BYK-361N (supplied by BYK Chemie, acrylic resin) | 0.5 part |
| Diethylene glycol diethyl ether | 43.6 parts |
| Compound 29 shown in Table 3 | 40.0 parts |

Example 4

An ink composition was obtained using the pigment dispersion A in accordance with the following recipe.

| | |
|---|---|
| Pigment dispersion A | 11.4 parts |
| Vinyl resin VYHD (supplied by Dow Chemicals, vinyl chloride-vinyl acetate resin) | 4.5 parts |
| BYK-361N (supplied by BYK Chemie, acrylic resin) | 0.5 part |
| Diethylene glycol dimethyl ethyl ether | 13.6 parts |
| Exxsol D80 (supplied by Exxon) | 10.0 parts |
| Compound 25 shown in Table 2 | 60.0 parts |

Example 5

An ink composition was obtained using the pigment dispersion B in accordance with the following recipe.

| | |
|---|---|
| Pigment dispersion B | 16.7 parts |
| Vinyl resin VYHD (supplied by Dow Chemicals, vinyl chloride-vinyl acetate resin) | 3.5 parts |
| Diethylene glycol diethyl ether | 59.8 parts |
| Exxsol D80 (supplied by Exxon) | 10.0 parts |
| Compound 20 shown in Table 2 | 10.0 parts |

Example 6

An ink composition was obtained using the pigment dispersion C in accordance with the following recipe.

| | |
|---|---|
| Pigment dispersion C | 12.5 parts |
| Vinyl resin VYHD (supplied by Dow Chemicals, vinyl chloride-vinyl acetate resin) | 3.5 parts |
| Diethylene glycol methyl ethyl ether | 44.0 parts |
| Compound 31 shown in Table 3 | 40.0 parts |

Example 7

An ink composition was obtained using the pigment dispersion C in accordance with the following recipe.

| | |
|---|---|
| Pigment dispersion C | 12.5 parts |
| Vinyl resin VYHD (supplied by Dow Chemicals, vinyl chloride-vinyl acetate resin) | 3.5 parts |
| Diethylene glycol methyl ethyl ether | 44.0 parts |
| Compound 3 shown in Table 1 | 20.0 parts |
| Compound 20 shown in Table 2 | 20.0 parts |

Example 8

An ink composition was obtained using the pigment dispersion D in accordance with the following recipe.

| | |
|---|---|
| Pigment dispersion D | 12.5 parts |
| Vinyl resin VYHD (supplied by Dow Chemicals, vinyl chloride-vinyl acetate resin) | 3.5 parts |
| Compound 3 shown in Table 1 | 84.0 parts |

Example 9

An ink composition was obtained using the pigment dispersion E in accordance with the following recipe.

| | |
|---|---|
| Pigment dispersion E | 11.4 parts |
| Vinyl resin VYHD (supplied by Dow Chemicals, vinyl chloride-vinyl acetate resin) | 4.5 parts |
| BYK-361N (supplied by BYK Chemie, acrylic resin) | 0.5 part |
| Ethylene glycol monobutyl ether acetate | 78.6 parts |
| Compound 3 shown in Table 1 | 5.0 parts |

Comparative Example 1

An ink composition was obtained in the same manner as in Example 1 except that the compound 3 shown in Table 1 used in the recipe of Example 1 was replaced with diethylene glycol methyl ethyl ether.

Comparative Example 2

An ink composition was obtained in the same manner as in Example 3 except that the compound 27 shown in Table 3 used in the recipe of Example 3 was replaced with cyclohexanone.

Comparative Example 3

An ink composition was obtained in the same manner as in Example 3 except that the compound 27 shown in Table 3 used in the recipe of Example 3 was replaced with ε-caprolactone.

Comparative Example 4

An ink composition was obtained in the same manner as in Example 1 except that diethylene glycol methyl ethyl ether used in the recipe of Example 1 was replaced with methyl isobutyl ketone.

As is evident from the following Table 4, the ink compositions of Examples 1 to 9, in which the compounds specified in the present invention were used as organic solvents respectively, were excellent in all of smell, viscosity stability, printing stability, drying properties, corrosion to printer, and adhesion. In particular, the ink compositions of Examples 1, 2 and 5 were excellent. On the other hand, the ink composition of Comparative Example 1 was poor in viscosity stability, printing stability, drying properties and adhesion. The ink composition of Comparative Example 2 was poor in smell, printing stability and corrosion. The ink composition of Comparative Example 3 was poor in smell, viscosity stability, printing stability, drying properties and corrosion. The ink composition of Comparative Example 4 was poor in smell, printing stability, corrosion and adhesion.

The evaluation methods are shown below.

<Smell>

Each of the ink compositions obtained in Examples 1 to 9 and Comparative Examples 1 to 4 was independently applied to a polyvinyl chloride resin sheet, of which the surface had not been treated, with a wire bar No. 6 (supplied by Toyo Seiki sha) in a thermostatic chamber at temperature of 25° C. and at a humidity of 30%, and 10 minutes later, the sheets with the ink compositions were sensuously tested for smell. ⊙ shows the presence of no unpleasant smell, ○ shows the presence of almost no unpleasant smell, Δ shows the presence of an unpleasant smell to some extent, x shows the presence of an unpleasant smell.

<Viscosity Stability>

The ink compositions obtained in Examples 1 to 9 and Comparative Examples 1 to 4 were evaluated for viscosity with an E type viscosimeter (supplied by NIKKISO Co., ltd.) before and after a 70° C. and 3-week accelerated aging. ○ shows that the rate of change of the viscosity was less than 10%, and x shows that the rate of change was at least 10%.

<Printing Stability>

The ink compositions obtained in Examples 1 to 9 and Comparative Examples 1 to 4 were evaluated as follows. Continuous printing was made on a polyvinyl chloride resin sheet, of which the surface had not been treated, with IP-6600 (supplied by Seiko I Infotech, wide format inkjet printer) at 25° C. The frequency of dot loss, curved flight or scattering of ink was evaluated. ○ shows that the frequency of dot loss, curved flight or scattering of ink was less than 10 in a 50-hour continuous test. Δ shows that the frequency of dot loss, curved flight or scattering of ink was from 10 to less than 20 in a 50-hour continuous test. x shows that the frequency of dot loss, curved flight or scattering of ink was 20 or more in a 50-hour continuous test.

<Drying Properties>

The ink compositions obtained in Examples 1 to 9 and Comparative Examples 1 to 4 were evaluated as follows. Solid printing was made on a polyvinyl chloride resin sheet, of which the surface had not been treated, with IP-6600 (supplied by Seiko I Infotech, wide format inkjet printer) at 25° C. The period of time required for drying at 40° C. was measured. ○ shows that the period of time required for drying was within 3 minutes. Δ shows that the period of time required for drying was more than 3 minutes and less than 6 minutes. x shows that the period of time required for drying was 6 minutes or more.

<Corrosion to Printer>

A printer material to be brought into contact with an ink was immersed in each of the ink compositions obtained in Examples 1 to 9 and Comparative Examples 1 to 4. The change rate of the length of the material and the change rate of the weight of the material between before and after an accelerated aging at 70° C. for 3 weeks were evaluated. ⊙ shows that one or both of the change rates of the length and the weight were less than 3%. ○ shows that one or both of the change rates were from 3% to less than 6%. Δ shows that one or both of the change rates were from 6% to less than 9%. x shows that one or both of the change rates were 9% or more.

<Adhesion>

The ink compositions obtained in Examples 1 to 9 and Comparative Examples 1 to 4 were evaluated for adhesion as follows. Printing was made on a polyvinyl chloride resin sheet, of which the surface had not been treated, with IP-6600 (supplied by Seiko I Infotech, wide format inkjet printer). The printed surface, on which printing had been carried out, was evaluated for adhesion with a rubbing tester (supplied by Tester Sangyo Co., Ltd., type AB301). In the evaluation, a piece of cloth (Cannequin No. 3) for a test was reciprocated 50 times at a load of 200 g. ○ shows that nothing on the printed surface was peeled off. Δ shows that partial discoloration occurred. x shows that the base material appeared due to peeling off.

TABLE 4

|  | Smell | Viscosity stability | Printing stability | Drying properties | Corrosion | Adhesion |
|---|---|---|---|---|---|---|
| Ex. 1 | ⊙ | ○ | ○ | ○ | ⊙ | ○ |
| Ex. 2 | ⊙ | ○ | ○ | ○ | ⊙ | ○ |
| Ex. 3 | ○ | ○ | ○ | ○ | ○ | ○ |
| Ex. 4 | ○ | ○ | ○ | Δ | Δ | ○ |
| Ex. 5 | ⊙ | ○ | ○ | ○ | ⊙ | ○ |
| Ex. 6 | ○ | ○ | ○ | ○ | ○ | ○ |
| Ex. 7 | ○ | ○ | ○ | ○ | ○ | ○ |
| Ex. 8 | ○ | ○ | ○ | Δ | Δ | ○ |
| Ex. 9 | Δ | ○ | ○ | ○ | ⊙ | ○ |
| CEx. 1 | ⊙ | X | X | X | ⊙ | X |
| CEx. 2 | X | ○ | X | ○ | X | ○ |
| CEx. 3 | Δ | X | Δ | Δ | X | ○ |
| CEx. 4 | X | ○ | X | ○ | X | Δ |

What is claimed is:

1. An ink composition for printing on non-absorbable printing media, containing an organic solvent and a pigment, which comprises as the organic solvent at least one compound selected from a compound represented by the formula (1) and a compound represented by the formula (2),

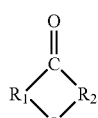

(1)

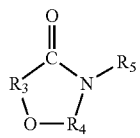

(2)

wherein each of $R_1$, $R_2$, $R_3$, and $R_4$ independently represents an alkylene group having 1 to 4 carbon atoms or an alkenylene group having 2 to 4 carbon atoms and $R_5$ represents a hydrogen atom or an alkyl group having 1 to 5 carbon atoms.

2. The ink composition according to claim 1, which further comprises as the organic solvent at least one solvent selected from the group consisting of a solvent represented by the formula (4), a solvent represented by the formula (5), a solvent represented by the formula (6) and a solvent represented by the formula (7), a diacetone alcohol solvent, a paraffin solvent, a naphthene solvent and a paraffin/naphthene solvent, $$R_{10}CO(OR_{11})_ZOR_{12} \quad (4)$$

$$R_{13}CO(OR_{14})_ZOCOR_{15} \quad (5)$$

$$R_{16}(OR_{17})_ZOR_{18} \quad (6)$$

$$R_{19}COOR_{20} \quad (7)$$

wherein each of $R_{11}$, $R_{14}$ and $R_{17}$ independently represents an ethylene group or a propylene group, each of $R_{10}$, $R_{12}$, $R_{13}$ and $R_{15}$ independently represents an alkyl group having 1 to 4 carbon atoms, each of $R_{16}$ and $R_{18}$ independently represents a hydrogen atom or an alkyl group having 1 to 4 carbon atoms, $R_{19}$ represents a 2-hydroxyethyl group, $R_{20}$ represents an alkyl group having 1 to 8 carbon atoms, and Z represents an integer of 1 to 3.

3. The ink composition according to claim 1, which further comprises a dispersant.

4. The ink composition according to claim 1, which further comprises a resin.

5. The ink composition according to claim 1, which is used as an inkjet ink.

* * * * *